(12) United States Patent  
Kim

(10) Patent No.: US 7,718,939 B2
(45) Date of Patent: May 18, 2010

(54) OPTICAL PICKUP APPARATUS

(75) Inventor: Bong-gi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 11/931,005

(22) Filed: Oct. 31, 2007

(65) Prior Publication Data  
US 2008/0156965 A1    Jul. 3, 2008

(30) Foreign Application Priority Data  
Dec. 28, 2006    (KR)    ............ 10-2006-0136809

(51) Int. Cl.  
G02B 7/04    (2006.01)
(52) U.S. Cl. .............. 250/201.5; 369/112.01
(58) Field of Classification Search ............... 250/216, 250/201.2, 201.5; 369/53.23, 112.01, 112.03, 369/112.15  
See application file for complete search history.

(56) References Cited  
U.S. PATENT DOCUMENTS

| 6,091,690 A |   | 7/2000 | Sano et al. |
| 6,828,537 B2 | * | 12/2004 | Jutte ........................ 250/201.2 |
| 2004/0213116 A1 | * | 10/2004 | Arai ......................... 369/53.23 |
| 2005/0161579 A1 | * | 7/2005 | Kim et al. ................. 250/201.5 |
| 2005/0243674 A1 | * | 11/2005 | Hirai ........................ 369/53.23 |
| 2006/0055993 A1 | * | 3/2006 | Kobayashi et al. ............. 359/3 |
| 2006/0228471 A1 | * | 10/2006 | Menz et al. ................. 427/204 |
| 2007/0040233 A1 | * | 2/2007 | Kariya ....................... 257/458 |

FOREIGN PATENT DOCUMENTS

| EP | 1 612 782 | 1/2006 |
| JP | 10-312571 | 11/1998 |
| JP | 2003203378 A | * 7/2003 |

OTHER PUBLICATIONS

Search Report issued by European Patent Office in European Patent Application No. 07123365.4 on Dec. 29, 2008.

* cited by examiner

*Primary Examiner*—Kevin Pyo  
(74) *Attorney, Agent, or Firm*—Stanzione & Kim, LLP

(57) ABSTRACT

An optical pickup apparatus includes a light source to emit light of a predetermined wavelength, an objective lens to focus the light emitted from the light source to form a light spot on an optical disc having a plurality of recording layers, a photodetector to detect a signal and an error signal by detecting the light reflected from the optical disc, and a light scattering portion to reduce an amount of the light reflected from a non-target layer of the recording layers and incident on the photodetector by scattering part of the light reflected from the optical disc during a reproduction of data from the optical disc.

30 Claims, 8 Drawing Sheets

OPTICAL PICKUP APPARATUS

CROSS-REFERENCE TO RELATED APPLICATION

This application claims all benefits accruing under 35 U.S.C. §119 from Korean Patent Application No. 2006-136809, filed on Dec. 28, 2006, in the Korean Intellectual Property Office, the disclosure of which is incorporated herein by reference.

BACKGROUND OF THE INVENTION

1. Field of the Invention

Aspects of the present invention relate to an optical recording and/or reproducing apparatus, and more particularly, to an optical pickup apparatus which can efficiently prevent degradation of a tracking signal due to an adjacent layer during reproduction of data from an optical disc having a plurality of recording layers.

2. Description of the Related Art

Optical discs are storage media for recording and reproducing data such as sounds, images, or documents by forming a large number of pits in a surface of an optical disc in order to change the reflection direction of a laser beam irradiated on the optical disc. Such optical discs typically include CDs (compact discs) and DVDs (digital versatile discs). Recently, high density recording media with a high recording capacity have been actively developed as a next generation of optical discs. The high density recording media typically include Blu-ray discs (BDs) and high definition DVDs (HD DVDs).

Data is recorded and/or reproduced to and/or from an optical disc using an optical recording and/or reproducing apparatus that uses an objective lens having a predetermined NA (numerical aperture) and a laser beam having a predetermined wavelength. The magnitude of the NA and the wavelength depend on the amount of information to be stored. That is, as the capacity of the optical disc increases, a light source of a shorter wavelength and/or an objective lens of a higher NA is used. For example, a laser beam of a 780 nm wavelength and an objective lens of 0.45 NA are used for a CD. A laser beam of a 650 nm wavelength and an objective lens of 0.6 NA are used for a DVD, which stores more data than a CD. A laser beam of a 405 nm wavelength and an objective lens of 0.85 NA are used for a BD, which stores more data than a DVD.

In other words, the recording capacity of the optical recording and/or reproducing apparatus to record and/or reproduce information to and/or from an optical disc using a light spot obtained by focusing a laser beam using an objective lens is in inverse proportion to the size of the focused light spot. The size S of a focused light spot is determined by the wavelength $\lambda$ of a laser beam and the NA of an objective lens as shown by Equation 1.

$$S \propto K \cdot \lambda / NA \quad \text{[Equation 1]}$$

(k is a constant which is based on an optical system and typically has a value between 1 and 2).

Thus, in order to increase the density of an optical disc, the size S of a light spot formed on the optical disc needs to be reduced. To reduce the size S of the light spot, as shown by Equation 1, the wavelength $\lambda$ of a laser beam needs to be decreased and/or the NA needs to be increased.

However, expensive parts have to be used to decrease the wavelength $\lambda$ of the laser beam. Also, when the NA of the objective lens is increased, the depth is decreased by a magnitude corresponding to the square of the NA. As a result, coma aberration is increased by a magnitude corresponding to the cube of the NA. Thus, there is a limit in increasing the density of an optical disc by reducing the size S of a light spot in the above two methods.

Although the DVD and BD have higher recording capacities compared to conventional media, due to a continuous need for an increase in the capacity of an optical disc, a multi-layer structure provided with a plurality of recording layers has been proposed. Accordingly, an optical disc having a plurality of multiple recording layers has been proposed, in which a single side or both sides of the optical disc have two or more recording layers. This multi-layer optical disc has a higher recording capacity than an optical disc having a single recording layer.

Meanwhile, a differential push-pull (DPP) method to correct an offset of a push-pull signal generated during the reproduction of an eccentric optical disc is generally used as a tracking method for a recordable optical disc. Typically, in the DPP method, a light beam is split into three components using a grating. The three components include, a 0 order light component (a main light component) and ±1 order light components (sub-light components). Regarding the relative magnitudes of the split light components, the light component ratio −1 order: 0 order: +1 order should be not less than 1:10:1 in consideration of light use efficiency, in other words, the 0 order main light component should have at least ten times the magnitude of the magnitudes of the ±1 sub-light components.

When the DPP method is used to detect a tracking error signal in a multilayer optical disc having a plurality of recording layers, for example, a dual layer optical disc having two recording layers, the tracking error signal is degraded because the 0 order main light component reflected from an adjacent layer overlaps with the ±1 order sub-light components reflected from a target layer. Since the difference between the magnitudes of the 0 order main light component reflected from the target layer and the 0 order main light component reflected from the adjacent layer is very large, the 0 order main light component of the adjacent layer does not affect a reproduction signal. However, the ±1 order sub-light components reflected from the target layer and the 0 order main light component reflected from the adjacent layer do not have a large difference in magnitude. Thus, the 0 order main light component of the adjacent layer substantially affects a differential signal (a sub-tracking signal (SPP)) used to detect the tracking error signal in the DPP method.

Even when the main light component reflected from the adjacent layer is input to a sub-detector, this does not necessarily affect cross-talk between the recording layers on an optical disc. If a light receiving magnification ratio condition satisfies Equation 2, the input of the main light component from the adjacent layer to the sub-detector does not cause any problem.

$$\frac{S_{pd}}{M^2} \leq 25 \quad \text{[Equation 2]}$$

($S_{pd}$: the size of a main detector, M: a light receiving magnification ratio)

However, when the light receiving magnification ratio M is increased to satisfy the above condition, the size of a pickup increases, making it difficult to design a slim and compact pickup. Also, the increase of the light receiving magnification ratio degrades the adjustment and reliability characteristics of a detector. Thus, it is difficult to satisfy the above condition without causing practical problems.

Thus, to address the above problems, U.S. Patent Publication No. US 2005/0161579 A1 discloses a method of blocking a main light component reflected from the adjacent layer from being received by first and second sub-photodetectors using a polarization member (i.e., a polarization hologram) in order to diffract the main light component reflected from the adjacent layer to areas other than the area of a detector. In this publication, an optical pickup has a structure such that a polarization of the light proceeding from a light source to an objective lens and a polarization of the light reflected from an optical disc are orthogonal to each other. The polarization hologram is used only diffract the polarization of the light reflected from the optical disc.

FIG. 1 illustrates an example of a hologram pattern 253 of a polarization hologram 25 used in the above-described optical pickup. As shown in FIG. 1, since the polarization hologram 25 that blocks a signal light cannot be formed to have a large pattern, when the center of the polarization hologram 25 and the optical axis of an objective lens do not accurately match due to an assembly error, part of the main light component reflected from the adjacent layer is transmitted to the first and second sub-photodetectors, affecting the quality of a tracking error signal. Also, since P and S waves are used, a blocking effect is reduced with respect to an attachment angle error of the polarization hologram 25.

Nevertheless, a more serious problem is that the polarization hologram 25 not only blocks the main light component reflected from the adjacent layer from being input to the sub-detector but also blocks the main light component (a signal component) reflected from the target (i.e., instant) reproduction layer from being input to the photodetector. That is, the main light component reflected from the target layer is input to the main photodetector to generate an RF signal. Since part of the main light component is blocked by the polarization hologram, the amplitude of a signal to be detected decreases so that a signal characteristic, that is, a jitter characteristic, is degraded. Generally, the profile of an input light of a light receiving portion is of a Gaussian type, i.e., a bell curve. However, the polarization hologram 25 blocks the center area of the Gaussian profile, that is, a portion where the amplitude of a signal is maximum. Thus, the polarization hologram 25 seriously degrades the RF signal characteristics.

When the surface area of the polarization hologram 25 is reduced in order to reduce degradation of RF signal characteristic, it becomes difficult to achieve the original goal to suppress the main light component reflected from the adjacent layer so as not to be incident to the sub-detector. Moreover, if the light receiving magnification ratio is small, the blocking surface area of the polarization hologram 25 should be larger, thereby reducing the size of the RF signal and degrading the quality of the RF signal.

To address the above problem, U.S. Publication No. US 2005/0161579 A1 discloses a sub-photodetector that is additionally provided to compensate for the signal characteristic degradation by separately detecting diffractive lights which are diffracted to reach an area separated from the photodetector. However, since the signal used for the compensation, that is, the light signal which is diffracted to reach the separate area, already includes cross-talk noise, the signal is hardly useful for appropriately compensating for the RF signal.

Thus, a practical solution to improve the degradation of the RF signal characteristic is to finely adjust the polarization hologram to find a point where the effect by the adjacent layer is minimized and simultaneously the original signal from the target reproduction layer is maximized. However, this solution requires more parts to make the fine adjustment, increasing costs and manufacturing time.

SUMMARY OF THE INVENTION

To address the above and/or other problems, aspects of the present invention provide an optical pickup apparatus which efficiently prevents the degradation of a tracking error signal of a target reproduction layer due to overlapping of light reflected from an adjacent layer with light reflected from the target reproduction layer during the reproduction of an optical disc having a plurality of recording layers.

Additional aspects and/or advantages of the invention will be set forth in part in the description which follows and, in part, will be obvious from the description, or may be learned by practice of the invention.

Aspects of the present invention provide an optical pickup apparatus which minimizes the degradation of an RF signal to prevent the degradation of a tracking error signal due to overlapping of a 0 order main light component reflected from the adjacent layer with ±1 order sub-light components reflected from the target layer during the reproduction of a multilayer disc.

According to an example embodiment of the present invention, an optical pickup apparatus includes a light source to emit light, an objective lens to focus the light emitted from the light source on a target reproduction layer of an optical disc having a plurality of recording layers, a photodetector to detect the light reflected from the optical disc, and a light scattering portion to reduce an amount of the light reflected from one or more non-target layers of the recording layers and incident on the photodetector by scattering part of the light reflected from the optical disc during a reproduction of data from the optical disc.

According to an aspect of the invention, the light scattering portion is located between the photodetector and the objective lens and is a plate having a light scattering area formed on a surface thereof.

According to an aspect of the invention, the optical pickup apparatus further includes a collimating lens to convert the light emitted from the light source to a parallel light beam, and a light scattering area formed on a surface of the collimating lens.

According to an aspect of the invention, the optical pickup apparatus further includes an optical path changer to change a path of the light emitted from the light source, and a light scattering area formed on a surface of the optical path changer.

According to an aspect of the invention, the surface of the optical path changer on which the light scattering area is formed faces the photodetector.

According to an aspect of the invention, the light scattering portion includes a light scattering area formed on a surface of the objective lens.

According to an aspect of the invention, the optical pickup apparatus further includes an optical path changer to change a path of the light emitted from the light source, and an astigmatic lens located between the optical path changer and the photodetector to generate astigmatism to detect a focus error signal, wherein a light scattering area is formed on a surface of the astigmatic lens.

According to an aspect of the invention, the photodetector includes a main photodetector to receive a 0 order light reflected from the optical disc and a first sub-photodetector and a second sub-photodetector to respectively receive a +1 order light and a −1 order light reflected from the optical disc and detect a tracking error signal based on the received 0 order light, +1 order light and −1 order light by using a differential push-pull method.

According to an aspect of the invention, the light scattering portion includes a light scattering area configured to scatter a portion of the light corresponding to an area of the photodetector.

According to an aspect of the invention, the light scattering portion operates regardless of divergence, convergence, and parallelism of the light as the light is emitted from the light source to the optical disc and reflected back towards the photodetector.

According to another example embodiment of the present invention, an optical path changer is used in an optical pickup apparatus including a light source to emit light, an objective lens to focus the light emitted from the light source on an optical disc having a plurality of recording layers, and a photodetector to detect a signal by detecting the light reflected from the optical disc, wherein the optical path changer guides the light emitted from the light source to proceed toward the objective lens and the light reflected from the optical disc to proceed toward the photodetector, and wherein a light scattering portion is formed on a surface of the optical path changer facing the photodetector to scatter the light reflected from the optical disc and incident on the photodetector.

According to another example embodiment of the present invention, an optical reproducing apparatus includes a spindle motor to rotate an optical disc having a plurality of recording layers, an optical pickup apparatus movably installed in a radial direction of the optical disc to reproduce information from the optical disc, a driving portion to drive the spindle motor and the optical pickup, and a control portion to control focusing and tracking servos of the optical pickup, wherein the optical pickup apparatus includes a light source to emit light, an objective lens to focus the light emitted from the light source on a target layer of the optical disc, a photodetector to detect the light reflected from the optical disc, and a light scattering portion to reduce an amount of light reflected from a non-target layer of the optical disc and incident on the photodetector by scattering a part of the light reflected from the optical disc during a reproduction of data from the optical disc.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
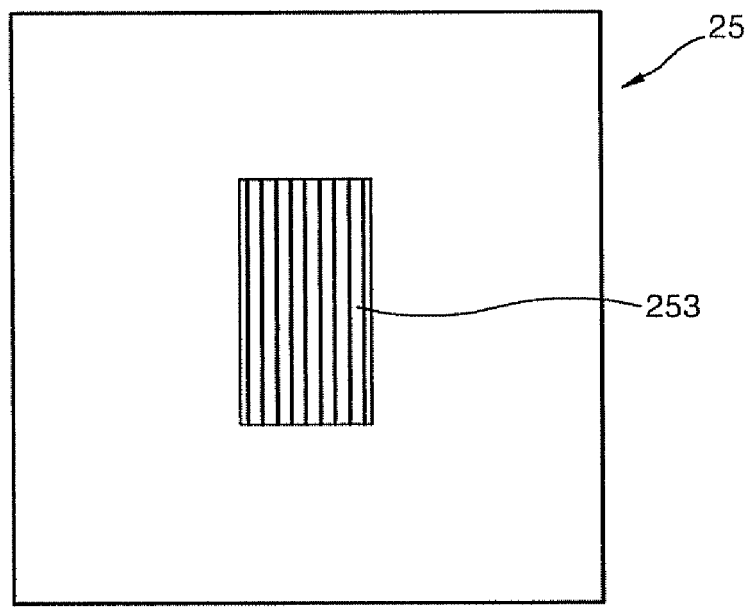
FIG. 1 illustrates a hologram pattern used in a conventional optical pickup apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
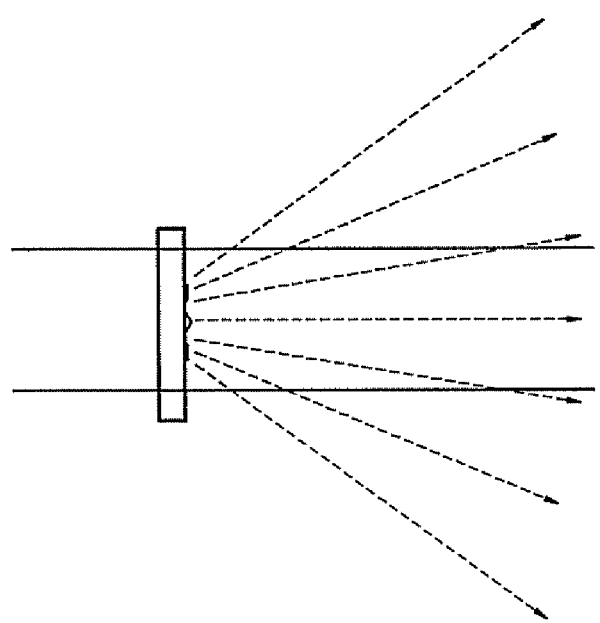
FIG. 2 illustrates a light scattering portion according to an example embodiment of the present invention.

FIG. 2 illustrates a light scattering portion according to an example embodiment of the present invention. Referring to FIG. 2, "light scattering" refers to when light incident on an uneven surface of an object is reflected in various directions. Light scattering can also be referred to as "diffuse reflection" because the light hits a surface and is irregularly reflected therefrom. In contrast, the light incident on a smooth plane, such as, for example, a mirror, is evenly reflected only in the opposite direction ("specular reflection" or "mirror reflection"). In most cases, a very smooth-looking plane is not a perfect plane viewed at a microscopic level. The plane is generally a group of small surfaces that are uneven in various directions. Thus, light diffusion is generated since light input in a direction is reflected in various directions and scattered with respect to the respective small surfaces. That is, light scattering or diffuse reflection refers to when the surface of an object reflects light in all directions so that light is rapidly diffused.

Light scattering creates noise in an optical pickup in which a signal is obtained by sending light to an optical disc and then controlling the light reflected from the optical disc to move in a constant direction using a laser and a lens. Thus, to use a common optical member as an optical pickup, a surface is processed to be smooth through a polishing work so that light scattering is prevented. The polished optical member not only minimizes light loss that can be generated in the transmission of light but also restricts light distortion (i.e., aberration).

Aspects of the present invention suggest a method of reducing the effect of reflected light generated in an adjacent layer by intentionally using light scattering that is generally not used because light scattering creates noise.

Typically, to increase storage density in an optical disc having two layers (dual layer optical disc), assuming that a layer close to a light incident surface of an optical disc is an L1 layer and a layer far from the light incident surface is an L0 layer (FIG. 3), the L1 layer has a reflection rate of about 30% and a transmission rate of about 70% or less and the L0 layer has a reflection rate of about 95% or less and a transmission rate of about 5% or less. Thus, during the recording and/or reproduction of data to the L1 layer, light passes through the L1 layer, is defocused on the L0 layer, and is reflected. Also, during the recording and/or reproduction of data to the L0 layer, light reflected from the L0 layer is defocused by the L1 layer. Since these reflected lights generated in the adjacent layer are defocused, the reflected lights reach a photodetector, and thus the size of a light spot becomes large. When the light is diffused as the size of the light spot on the adjacent layer is very large, a signal light is relatively less affected. However, when the size of the light spot on the adjacent layer is small (although still larger than that of the signal light), the signal light is relatively greatly affected.

In the case of an existing DVD dual disc, since the distance between layers is sufficiently long, the reflected light of the adjacent layer is defocused and a light spot formed on the photodetector has a relatively large size. Thus, the signal light is not greatly affected. However, in the case of a high density optical disc having a higher capacity than a DVD, such as, for example, a BD, an HD-DVD, or other types of next-generation high density DVDS, the NA of an objective lens needs to be increased. Accordingly, the thickness of the optical disc should prevent degradation of performance due to tilt of the optical disc. To this end, the thickness of the high density optical disc is reduced to about 0.1 mm.

When the high density optical disc has a structure of a plurality of recording layers, the distance between layers is determined in proportion to the depth of focus. Since the depth of focus is proportional to $\lambda/NA^2$, the distance between layers is about 55 µm in a DVD dual disc and about 17 µm in a BD, which is quite shorter than that of the DVD. When an optical disc having a higher density than the DVD has a plurality of layers, the distance between layers is very short. Thus, light reflected from the adjacent layer of a high density optical disc is formed on the photodetector in a small size spot, which may greatly affect a reproduction signal light.

Aspects of the present invention are based on the property that the signal light is less affected when the spot size of light reflected from the adjacent layer of the high density optical disc formed on the photodetector is relatively large, such as, for example, in the DVD dual disc. That is, aspects of the present invention provide a method of reducing the amount of light received on the photodetector by scattering the light in all directions appropriately using the above-described light scattering. In a typical optical pickup as described in connection with FIG. 1, the diffraction of light being received in an area of the photodetector using a hologram causes light loss not only in the reflection light of the adjacent layer but also in the signal light. However, according to aspects of the present invention, since only part of the light reaching the photodetector is scattered so that the amount of light is relatively reduced, even when the amount of the signal light is reduced, the reduction amount is substantially smaller than the reduction amount in the method of blocking light using a hologram.

Figure 3:
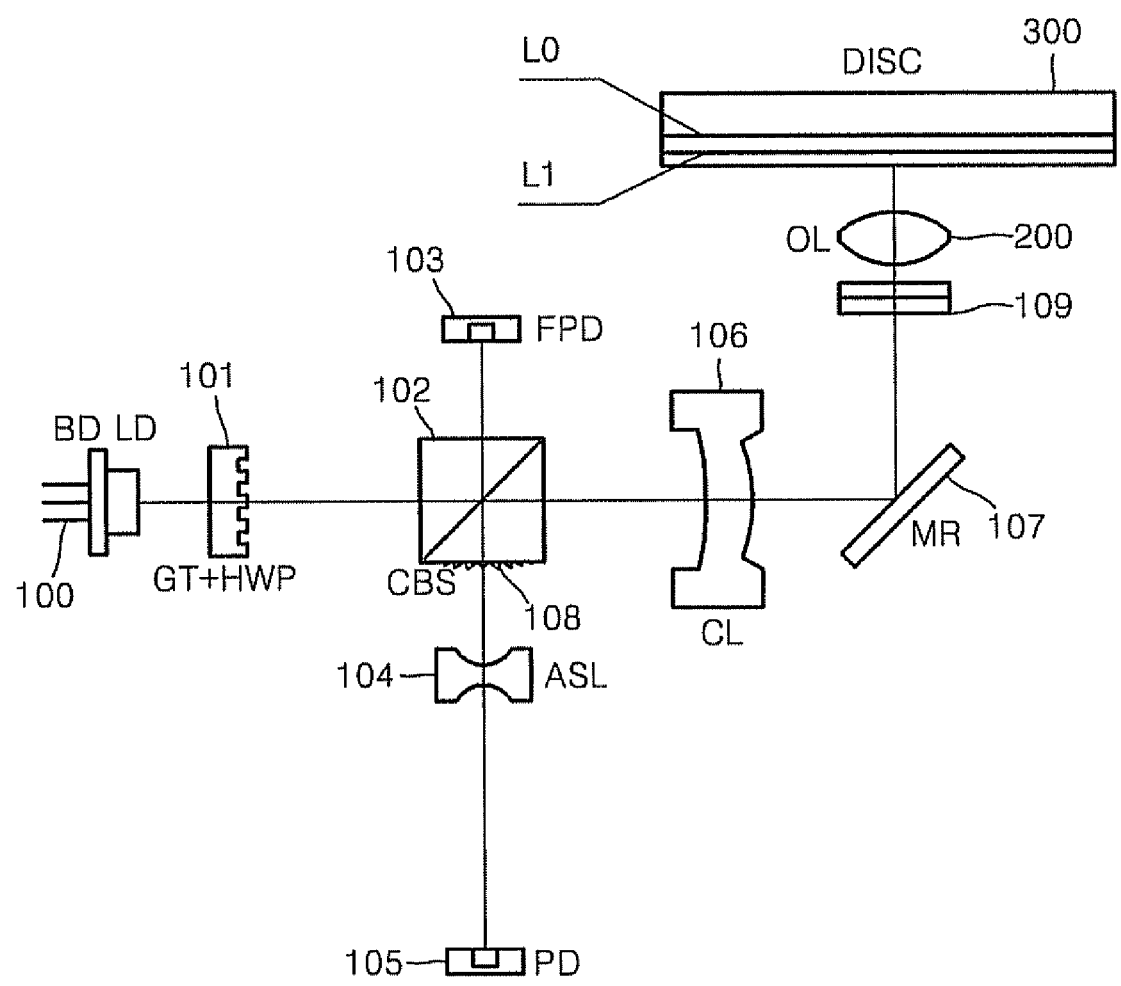
FIG. 3 illustrates an optical system of an optical pickup apparatus according to an example embodiment of the present invention.

FIG. 3 illustrates an optical system of an optical pickup apparatus according to an example embodiment of the present invention. Referring to FIG. 3, the optical pickup apparatus includes a light source 100 that emits a laser beam having a wavelength appropriate for the type of an optical disc used in the optical system, such as, for example, a BD. In the present embodiment, a semiconductor laser (LD) that emits a light of a 405 nm wavelength, which is a light in a blue wavelength range satisfying a BD standard, can be used as the light source 100. However, it is understood that the light source 100 is not limited to emitting a 405 nm wavelength, and may emit smaller or larger wavelengths according to a type of DVD used. A grating 101 is a light splitting diffraction device that splits the light emitted by the light source 100 into three light beams. When a half wave plate (HWP) that rotates the polarization direction is used, the HWP according to an aspect of the present invention is integrally formed with the grating 101. Although FIG. 3 illustrates the grating 101 (GT+HWP) as being integrally formed with the half wave plate, the half wave plate and the grating 101 can be separately provided in other aspects. The grating 101 splits the light emitted from the light source 100 into 0 order light (i.e., a main light component) and ±1 order lights (i.e., sub-light components) to detect a tracking error signal using a differential push-pull (DPP) method. When the light is split into three light beams by the grating 101, a reproduction signal is obtained from the 0 order light detection signal reflected from an optical disc 300 and a tracking error signal is obtained from using detection signals of the ±1 order lights and the 0 order light reflected from the optical disc 300.

In the present embodiment, the optical pickup apparatus includes an optical path changer 102 to change the proceeding path of the light and a collimating lens (CL) 106 to change a divergent light beam passing through the optical path changer 102 to a parallel light beam. Also, the optical pickup apparatus includes an objective lens (OL) 200 to form a light spot by focusing the light on the optical disc 300 for recording and/or reproducing information. The objective lens 200 is installed at an actuator (not shown) to correct focusing and tracking errors. A photodetector (PD) 105 receives the light reflected from the optical disc 300, detects an information signal and an error signal based on the received light, and converts an optical signal reflected from the optical disc 300 to an electric signal.

The optical path changer 102 guides the light emitted from the light source 100 toward the objective lens 200 and the light reflected from the optical disc 300 toward the photodetector 105. For example, a cubic beam splitter (CBS) or a plate type beam splitter (PBC) may be used as the optical path changer 102. Also, a polarization type beam splitter or a non-polarization type beam splitter may be used as the optical path changer 102. A feed-back photo diode (FPD) 103 may be provided to control an output value of light from the light source 100. It is understood that the optical path changer 102 is not limited to being a CBS or a PBS, and may instead be various other types of optical path changers as well, such as half-silvered mirrors, various types of triangular prisms, etc.

The divergent light passing through the optical path changer 102 is converted to a parallel light beam by the collimating lens 106. The proceeding path of the light is changed by a reflection mirror 107 so as the light is incident on the objective lens 200. Also, a quarter wave plate 109 to change the polarization of light incident on the objective lens 200 may be provided between the reflection mirror 107 and the objective lens 200. Further, an astigmatic lens 104 to generate astigmatism to detect a focus error signal using an astigmatism method may be provided between the optical path changer 102 and the photodetector 105.

In the present embodiment, the light source 100 emits a light of an approximately 405 nm wavelength that is in a blue wavelength range which satisfies the BD standard, and the objective lens 200 has an NA of 0.85 which also satisfies the BD standard. Also, the optical disc 300 may be a high capacity BD that is a multilayer optical disc having recording layers L1 and L0. However, aspects of the present invention are not limited to the above conditions. For example, the optical disc may be a DVD, the light source 100 may emit a light of an approximately 650 nm wavelength in a red wavelength range which satisfies a DVD standard, and the objective lens 200 may have an NA of 0.6 which satisfies the DVD standard. Also, a light source module capable of emitting a plurality of lights having various wavelengths, for example, a blue wavelength of 405 nm and a red wavelength of 650, may be provided as the light source 100 so that the optical pickup apparatus according to aspects of the present embodiment can be used for a BD, an HD DVD, and a DVD, or any combination thereof. The objective lens 200 is configured to have effective NAs appropriate for various cases, or may have a separate member, such as a hologram, to adjust an effective NA. Also, an additional optical structure for using a DVD or a CD can be further provided in addition to the structure shown in FIG. 3.

Figure 4:
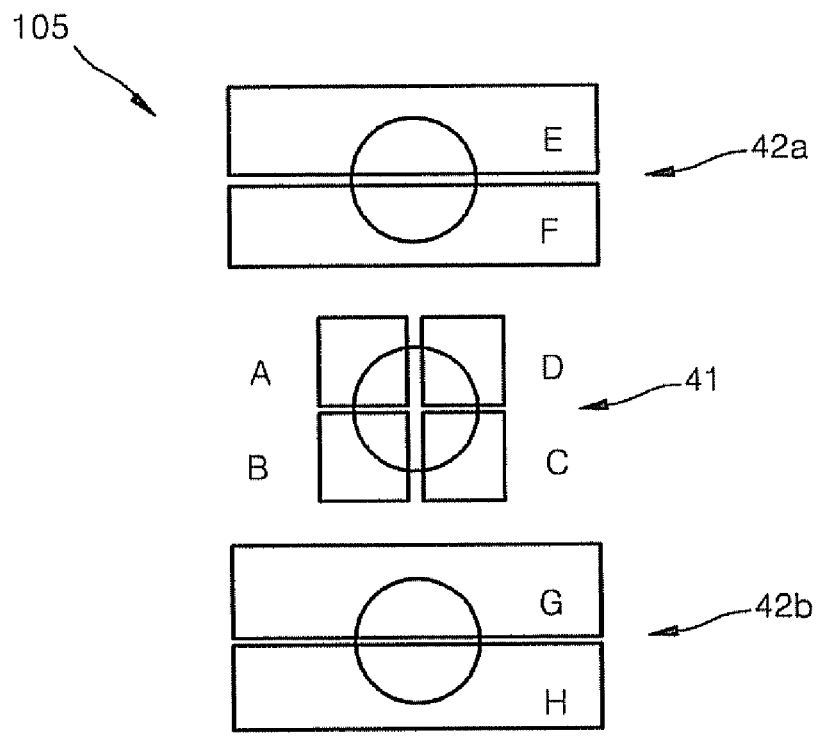
FIG. 4 illustrates an example of a photodetector that can be used with aspects of the present invention.

FIG. 4 illustrates the structure of the photodetector 105 to detect a tracking error signal using the DPP method. Referring to FIG. 4, when the light emitted from the light source 100 is split into at least three beams, the photodetector 105 includes a main photodetector 41 to receive the 0 order light and sub-photodetectors 42a and 42b to receive the ±1 order lights. According to an aspect of the present invention, the main photodetector 41 is divided into four parts, where one dividing line (i.e., the horizontal dividing line in 41 separating A and D from B and C) is oriented in a direction R corresponding to a radial direction of the optical disc 100 and another line (i.e., the vertical dividing line in 41 separating A and B from D and C) is oriented in a direction T corresponding to a tangential direction, to detect a focus error signal and a tracking error signal. Also, according to an aspect of the present invention, the first and second sub-photodetectors 42a and 42b are each divided into two parts in the direction R so that the tracking error signal can be detected in the DPP method. It is understood that the main photodetector 41 and sub-photodetectors 42a and 42b may be divided differently than shown in FIG. 4, for example, the sub-photodetectors 42a and 42b may be divided into four parts instead of two.

When the light receiving areas provided in the main photodetector 41 to receive the 0 order light are A, B, C, and D and the light receiving areas provided in the first and second photodetectors 42a and 42b to receive the ±1 order lights are E and F, and G and H, respectively, the tracking error signal detected in the DPP method is TEPdpp=[(A+D)−(B+C)]−k [(E−F)+(G−H)]. Here, k is a coefficient according to the light amount ratio of the 0 order light and the ±1 order lights. When the light amount ratio is 1:10:1, the value of k is 5(=10/(1+1)).

The light amount ratio of the 0 order light and the ±1 order lights is set to 1:10:1 because a reproduction signal can be obtained from the 0 order light signal containing information. Thus, setting the light amount of the 0 order light to be relatively large is advantageous in view of light use efficiency. It is understood that the light amount ratio may differ from 1:10:1, for example, the magnitude corresponding to the 0 order light may be more than ten times the magnitude of the ±1 order lights.

When the optical disc 100 is a dual disc having two layers, and data is recorded and/or reproduced to and/or from one of the L1 layer that is close to the light incident surface of the optical disc 100 and the L0 layer that is farther from the light incident surface, the light incident on the photodetector 105 is affected not only by the target layer (i.e., target reproduction layer) where the focus of the objective lens 200 is located but also by the adjacent layer. For example, when the L1 layer is the target layer from which data is to be reproduced, the $0^{th}$ order light reflected from the L0 layer arrives at the first and second sub-photodetectors 42a and 42b which are intended to receive the ±1 order lights reflected from the L1 layer, thereby affecting the tracking error signal. This is because the light amount of the 0 order light is much greater than those of the ±1 order lights as described above.

Thus, to prevent the tracking error signal from being affected by the 0 order light of the adjacent layer, a light scattering portion is provided which reduces the amount of light reflected from a non-target layer (i.e., the adjacent layer) of the recording layers and incident on the photodetector 105 by scattering part of the light reflected from the optical disc 300 during the reproduction of data from the optical disc 300. According to aspects of the present invention, a light scattering area 108 that is formed in part of one of the surfaces of the optical path changer 102 facing the photodetector 105 is provided as the light scattering portion. According to the above structure, the size of a light spot of the main light of the adjacent layer incident on the photodetector 105 is increased, thereby decreasing the light amount at any smaller a particular position without affecting the light incident on the objective lens 200. Also, since a separate optical member is not needed, the structure of the optical pickup apparatus becomes simpler.

The light scattering area 108 performs the light scattering regardless of the divergence, convergence, and parallelism of the light and may be formed by making the center portion of the surface of the optical path changer 102 relatively rough, so that the light passing through the center portion of the surface of the optical path changer 102 is scattered. Also, the size and shape of the light scattering area 108 may be configured such that the size of the light reflected from the adjacent layer matches the size of the photodetector 105. That is, the shape of the light scattering area 108 may be varied according to the shape of the photodetector 105. According to an aspect of the present invention, the shape of the light scattering area 108 covers the entire surface of the photodetector 105 except for the minimum size corresponding to the size of the main photodetector 41 and sub photodetectors 42a and 42b. However, it is understood that aspects of the present invention are not limited to this, and the light scattering area 108 may cover more or less than this minimum size.

That is, the size of the light scattering area 108 may vary according to the focal length of the collimating lens 106, the astigmatic lens 104, the size of the photodetector 105, and the position of the light scattering area 108. The size of the light scattering area 108 may be configured to scatter all the light reflected from the adjacent layer of the optical disc 300 reaching the area of the photodetector 105.

Aspects of the present invention may employ a variety of methods to form the light scattering area 108. According to an aspect of the present invention, the simplest method is to skip a polishing work for a corresponding portion only. Another method is to form a silicon layer having small crystal particles. The silicon layer having small crystal particles, preferably, a grain size of not more than 0.05 μm, may be formed by forming a silicon layer having no impurities on a substrate in a low pressure chemical vapor deposition method and performing a vacuum thermal process for the silicon layer, for example, in an in-situ method. Thus, the scattering of light can be maximized using an appropriate crystal particle size. It is understood that grain sizes of larger than 0.05 μm may instead be used, that methods other than in-situ methods may also be used to perform the vacuum thermal process for the silicon layer, and that compositions other than silicon may be used to make a layer having small crystal particles.

Also, in a method of using an embossed film, a transparent or semi-transparent light scattering embossed film is used to make a transfer sheet. When the transfer sheet is used, an embossed layer of an embossed film and a detached printing layer of a transfer sheet print layer are separated from each other so that an uneven surface of the embossed film is formed at a position where the scattering portion is located. It is understood that the transparency of the embossed film may vary, and that the films may be made of various materials, such as plastic, etc.

The operation of the optical pickup apparatus according to aspects of the present invention is described in detail with reference to FIG. 3. The light emitted from the light source 100 is diffracted by the grating 101 to form three beams to detect a tracking error signal. The light is converted to a parallel light beam by passing through the optical path changer 102 and the collimating lens 106 and reflected by the reflection mirror 107 to proceed toward the objective lens 200. The parallel light beam is converted to a circular polarized light beam by passing through the quarter wave plate 109 located in front of the objective lens 109. The circular polarized light beam passes through the objective lens 200 and forms a light spot on the recording layer L1 or L0 of the optical disc 300.

The light reflected from the L1 layer (assumed to be an instant reproduction layer, i.e., a target layer) and the L0 layer (assumed to be an adjacent layer) of the optical disc 300 passes through the optical path changer 102 again and is transferred to the photodetector 105. Of the light passing through the center portion of the objective lens 200, a portion of the light to be incident on the photodetector 105 is scattered by the light scattering area 108 formed at the center portion of the surface of the optical path changer 102 facing the photodetector 105.

According to the above structure, the problem of the prior art in which part of the light reflected from the instant reproduction layer and incident on the photodetector 106 is completely blocked can be avoided. Also, since only the portion of the main light reflected from the adjacent layer and reaching the photodetector 105 is scattered, the size of the main light of the adjacent layer arriving at the first and second sub-photodetectors 42a and 42b increases while the concentration of the main light reflected from the adjacent layer on the first and second sub-photodetectors 42a and 42b decreases. Thus, since the concentration of the main light of the adjacent layer decreases, the main light reflected from the adjacent layer is more easily distinguished from the ±1 order lights reflected from the instant reproduction layer, thereby reducing the degradation of the tracking error signal.

Figure 5A:
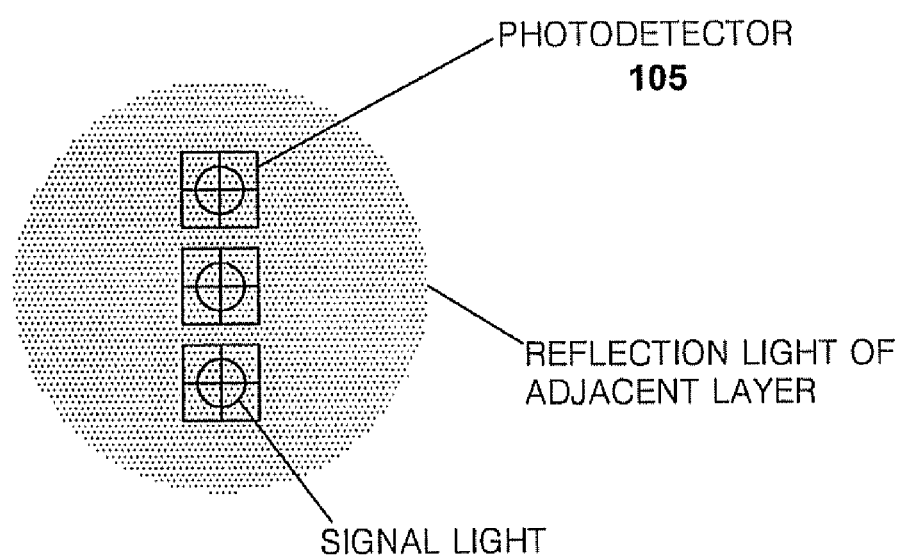
FIGS. 5A-5C illustrate the distribution of light focused on a photodetector during the reproduction of a dual optical disc using the optical pickup apparatus according to aspects of the present invention.
Figure 5B:
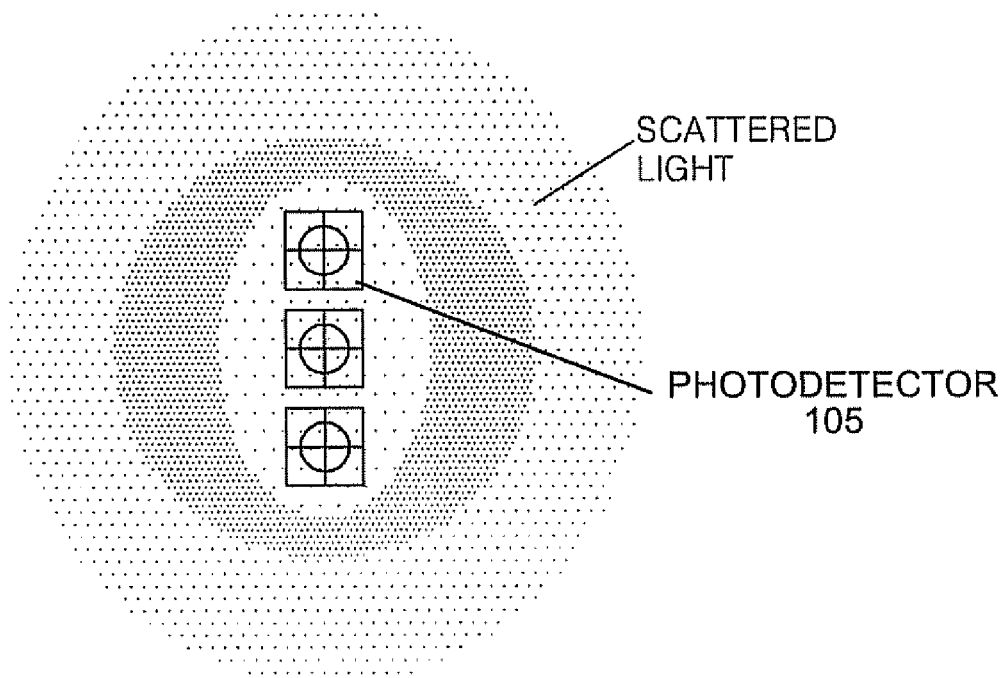
Figure 5C:
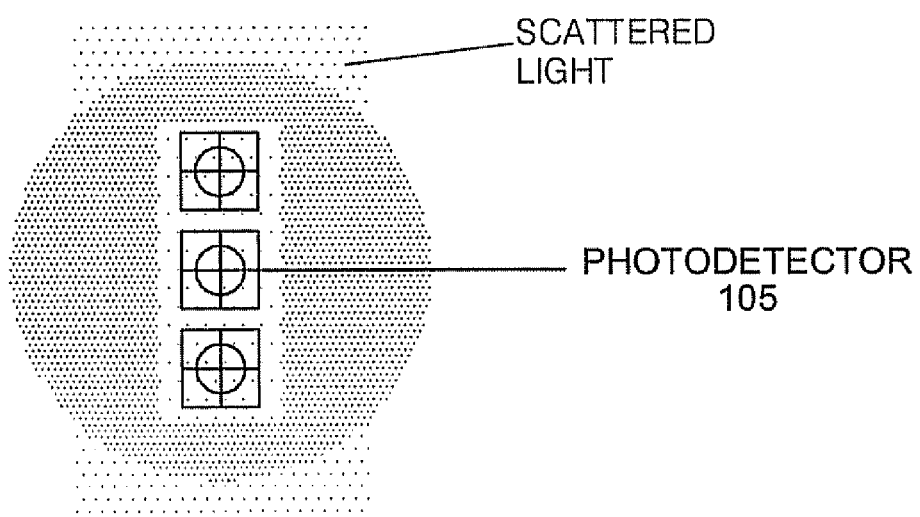

FIGS. 5A-5C illustrate the distribution of the light received by the photodetector 105 when the L1 layer of the optical disc 300 is reproduced using the optical pickup apparatus configured as above. When the light scattering portion is not provided, the reflection light of the adjacent layer covers an entire area of the photodetector 105, and is concentrated across the entire area, in particular, on the sub-photodetectors 42a and 42b, as shown in FIG. 5A. However, in the optical pickup apparatus employing the light scattering portion 108, for example, in an oval shape as shown in FIG. 5B, the reflection light of the adjacent layer is widely scattered to increase the light size. Accordingly, the concentration of the reflection light of the adjacent layer incident on the photodetector 105 is reduced, and a portion corresponding to the signal light is not completely blocked. FIG. 5C illustrates a case in which the shape forming the light scattering area 108 is rectangular instead of oval according to another aspect of the present invention. Furthermore, while not illustrated, it is understood that the light scattering area 108 is not limited to being oval shaped or rectangular shaped, and may instead scatter reflected light according to a wide variety of shapes, such as squares, circles, patterns corresponding to a perimeter of the photodetector 105, etc.

Figure 6:
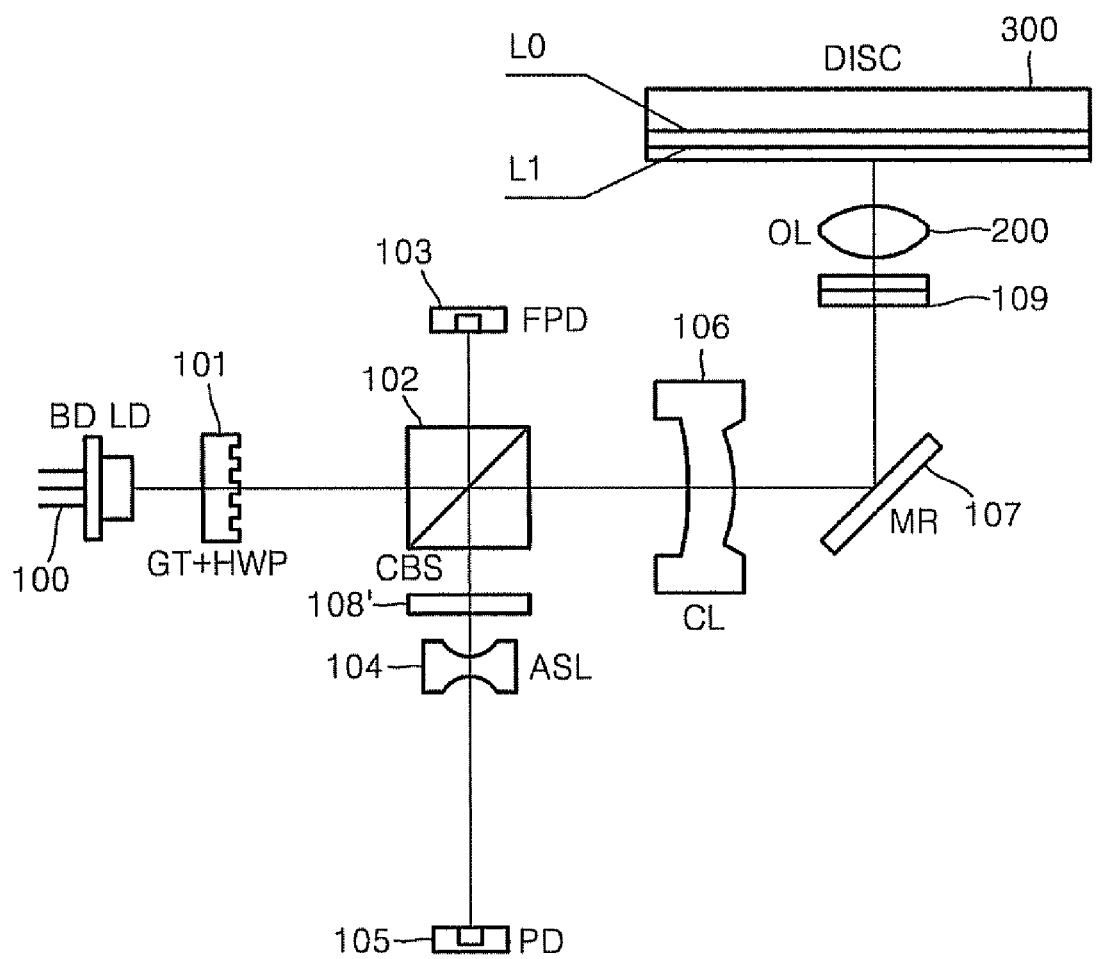
FIG. 6 illustrates an optical pickup apparatus according to another example embodiment of the present invention.

FIG. 6 illustrates an optical pickup apparatus according to another example embodiment of the present invention. Referring to FIG. 6, the light scattering portion is not formed at the center portion of the surface of the optical path changer 102 facing the photodetector 105. Instead, a plate 108' which is a separate optical member having a light scattering area formed in part of a surface thereof is provided. According to an aspect of the present invention, the plate 108' is located between the optical path changer 102 and the photodetector 105, and may be made of various materials, such as glass, plastic, etc. Such a structure can increase the size of the main light of the adjacent layer incident on the photodetector 105 (that is, the structure can decrease the light amount concentrated at a particular position) without substantially affecting the light incident on the objective lens 200. Since the other portions of the optical pickup apparatus are the same as those of the optical pickup apparatus shown in FIG. 3, a detailed description thereon is omitted herein. According to the structure shown in FIG. 6, the light passing through the center portion of the objective lens 200 and incident on the photodetector 105, i.e., corresponding to a size of the photodetector 105, is scattered by the plate 108', achieving substantially the same benefits as the example embodiment described above in connection with FIG. 3.

According to an aspect of the example embodiment shown in FIG. 6, the plate 108' where the light scattering area is formed is located between the optical path changer 102 and the photodetector 105. However, the plate 108' successfully operates even when the plate 108' is located at any position between the photodetector 105 and the objective lens 200, according to other aspects of the example embodiment shown in FIG. 6. Since the plate 108' weakens part of the 0 order light of the adjacent layer that overlaps the 0 order light and the ±1 order lights reflected from an instant recording and/or reproducing layer, the degradation of the tracking error signal due to the interference light of the adjacent layer is prevented.

Furthermore, according to another aspect of the example embodiment shown in FIG. 6, the plate 108' may be located anywhere along the optical path, i.e., anywhere from the light source 100 to the optical disc 300 and back to the photodetector 105. In this case, even when the amount of incident light is only slightly reduced since the plate 108' is located at a position along the optical path which is not between the optical path changer 102 and the photodetector 105 so as to scatter the incident light on the optical disc 300, the plate 108' still increases the size spot of the main light arriving at the first and second sub-detectors 42a and 42b of the photodetector 105 from the adjacent layer, thereby reducing degradation of the tracking error signal due to the interference light of the adjacent layer.

Figure 7A:
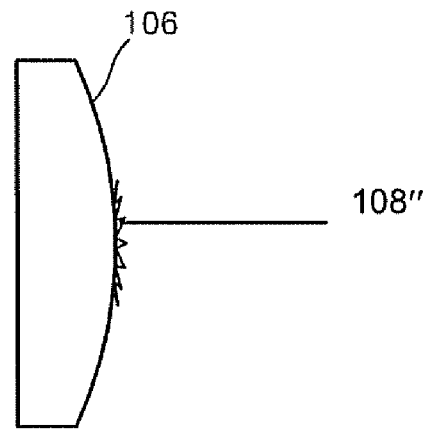
FIGS. 7A-7C illustrate examples of the light scattering portion of an optical pickup apparatus according to yet another example embodiment of the present invention.
Figure 7B:
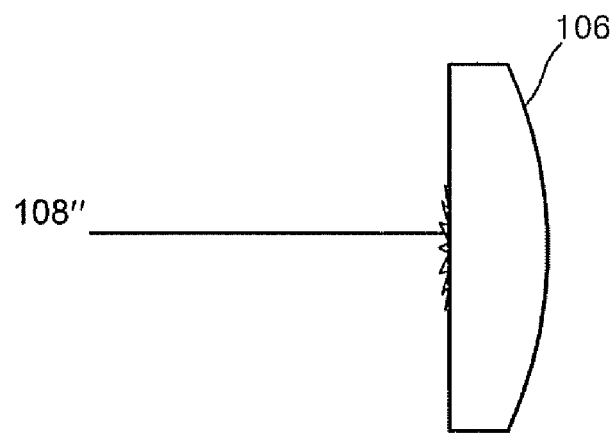
Figure 7C:
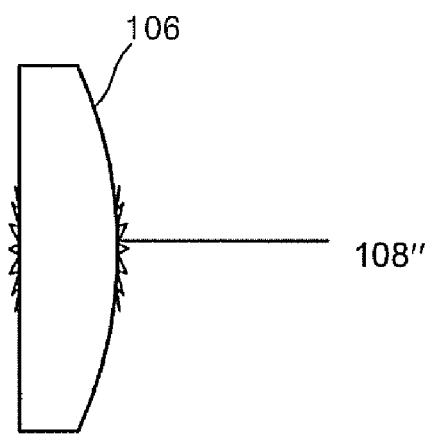

FIGS. 7A-7C illustrate examples of the light scattering portion of an optical pickup apparatus according to yet another example embodiment of the present invention. Referring to FIGS. 7A-7C, the light scattering portion 108" is formed on a surface or both surfaces of the collimating lens 106, instead of on the center portion of the surface of the optical path changer 102 facing the photodetector 105 as in FIG. 3. Accordingly, the same purpose of increasing the spot size and reducing the concentration of light reflected from the adjacent layer is achieved even when the light scattering portion 108" is formed in a portion of a surface or both surfaces of the collimating lens 106.

Figure 8A:
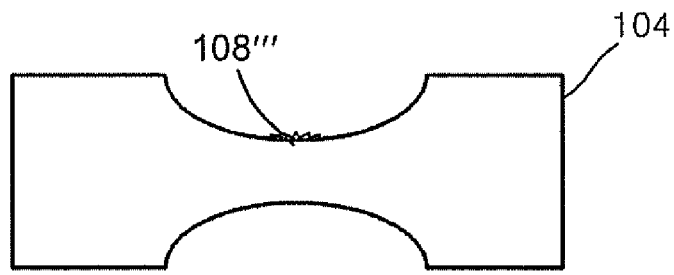
FIGS. 8A-8C illustrate examples of the light scattering portion of an optical pickup apparatus according to still another example embodiment of the present invention.
Figure 8B:
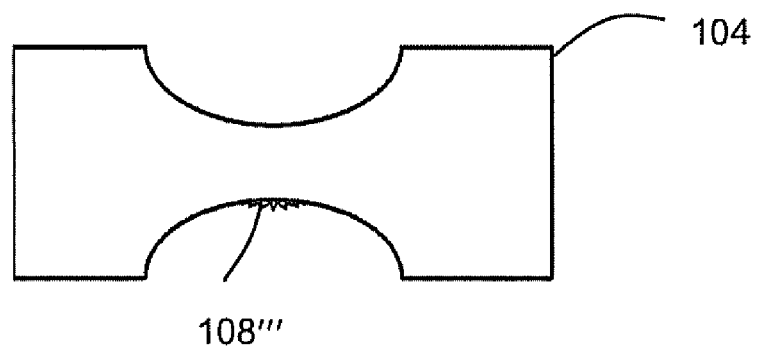
Figure 8C:
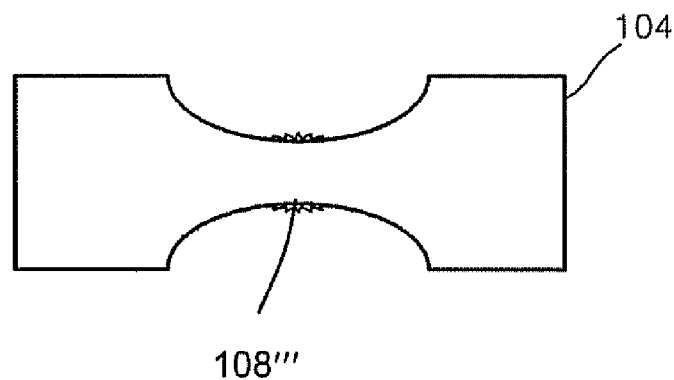

FIGS. 8A-8C illustrate examples of the light scattering portion of an optical pickup apparatus according to still another example embodiment of the present invention. Referring to FIGS. 8A-8C, the light scattering portion 108'" is formed on a surface or both surfaces of the astigmatic lens 104, instead of on the center portion of the surface of the optical path changer 102 facing the photodetector 105 as in FIG. 3. Accordingly, the same purpose of increasing the spot size and reducing the concentration of light reflected from the adjacent layer is achieved even when the light scattering portion 108''' is formed in a portion of a surface or both surfaces of the astigmatic lens 104.

Although not shown in the drawings, according to another example embodiment of the present invention, the light scattering area can be formed in a portion of the surface or both surfaces of the objective lens 200. In this structure, the same purpose of increasing the spot size and reducing the concentration of light reflected from the adjacent layer is achieved in a simple manner without using a separate optical member.

Figure 9:
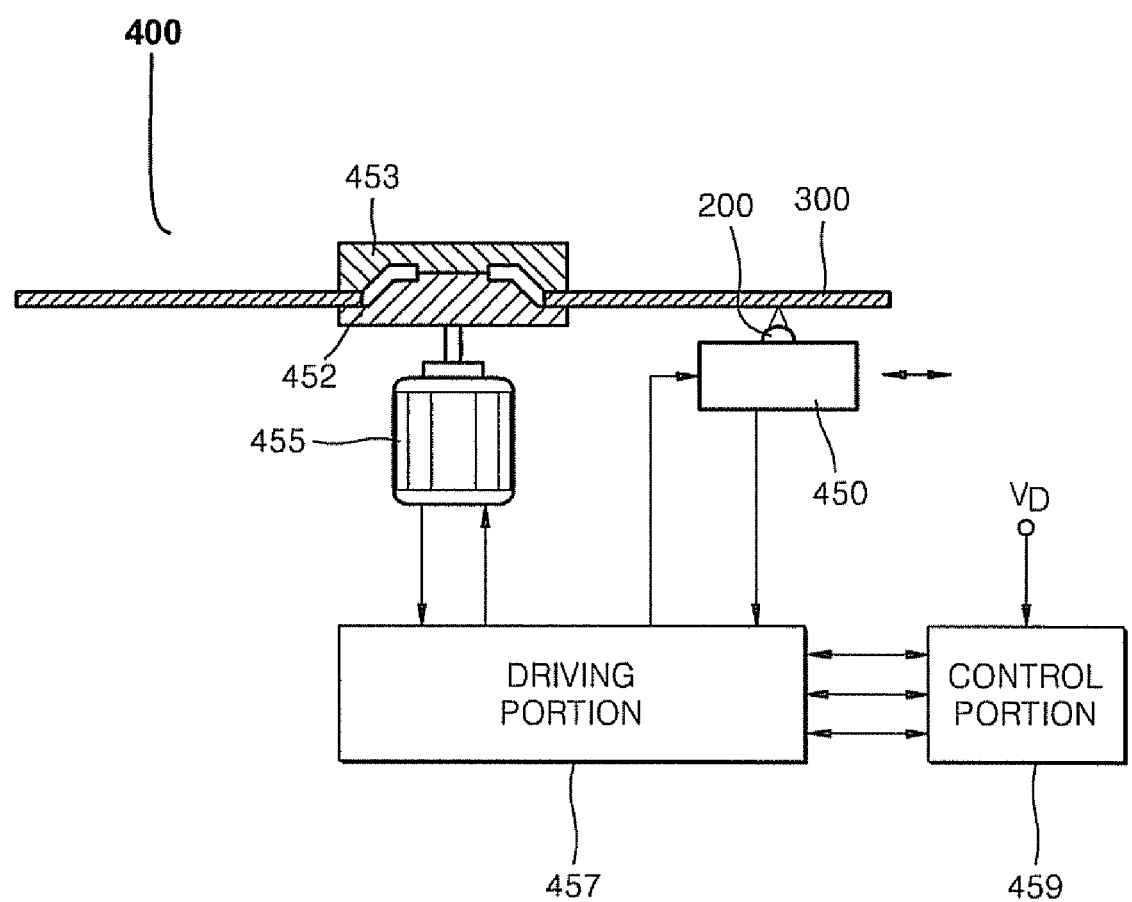
FIG. 9 illustrates an example of an optical recording and/or reproduction apparatus including the optical pickup apparatus according to aspects of the present invention.

FIG. 9 illustrates the configuration of an optical recording and/or reproducing apparatus 400 employing the optical pickup apparatus according to aspects of the present invention. Referring to FIG. 9, the optical recording and/or reproducing apparatus 400 includes a spindle motor 455 to rotate the optical disc 300, an optical pickup 450 to move in a radial direction of the optical disc 300 and record and/or reproduce information to and/or from the optical disc 300, a driving portion 457 to drive the spindle motor 455 and the optical pickup 450, and a control portion 459 to control focusing and tracking servos of the optical pickup 450. Reference numerals 452 and 453 respectively denote a turntable and a clamp to clamp the optical disc 300.

The light reflected from the optical disc 300 is detected by the photodetector provided in the optical pickup 450 and opto-electrically converted to an electric signal. The electric signal is input to the control portion 459 through the driving portion 457. The driving portion 457 controls the rotation speed of the spindle motor 455, amplifies an input signal, and drives the optical pickup 450. The control portion 459 transmits commands to adjust the focusing servo and the tracking servo based on the signal output from the driving portion 457 so that the focusing and tracking operations of the optical pickup 450 are performed. The optical pickup 450 may be embodied in a substantially similar manner to any of the optical systems shown in FIGS. 3-8C.

In the optical recording and/or reproducing apparatus 400 employing an optical pickup apparatus according to aspects of the present invention, since the interference light of the adjacent layer is conveniently reduced during the recording and/or reproducing of an optical disc having a plurality of recording layers, the degradation of the detected tracking error signal is easily prevented.

The structure of an optical pickup system according to aspects of the present invention provides a light scattering portion, such as the light scattering portion 108 (FIG. 3), 108' (FIG. 6), 108'' (FIGS. 7A-7C), or 108''' (FIGS. 8A-8C) which scatters the part of the light passing through the center portion of the objective lens, thereby solving the problem of the prior art in which the part of the 0 order light of the adjacent layer that overlaps the 0 order light and the ±1 order lights reflected from the instant recording/reproduction layer is completely blocked. Also, aspects of the present invention achieve the feature that the error generated in a reproduction tracking signal by the interference light of the adjacent layer is easily and efficiently reduced compared to the conventional technology. Furthermore, aspects of the present invention reduce the degradation of a reproduction signal itself.

Also, according to aspects of the present invention, unlike the conventional method, there is no need to align the hologram pattern, the optical axis of the objective lens, and the inclination of the hologram, thereby eliminating potential alignment problems. In addition, aspects of the present invention prevent the degradation of the reproduction signal without using an auxiliary detector to compensate for the degradation of the reproduction signal according to the diffraction of the reproduction light. Since the light scattering portion according to aspects of the present invention can be located anywhere along an optical path from the light source 100 to the optical disc 300 and still achieve beneficial results, a degree of freedom in designing the optical pickup apparatus is increased.

Although in the present specification the above structure is described in relation to a high density optical disc such as a BD or an HD DVD, aspects of the present invention can be applied to other optical discs, such as a DVD, so that a signal characteristic can be improved. Also, although the above description is made with reference to the drawings illustrating dual layer optical discs, aspects of the present invention can be applied to an optical pickup for an optical disc having three or more layers.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the light scattering portion 108 shown in FIG. 3 can be combined with the light scattering portion 108''' shown in any of FIGS. 8A-8C. Accordingly, it is intended, therefore, that aspects of the present invention not be limited to the various example embodiments disclosed, but that aspects of the present invention includes all embodiments falling within the scope of the appended claims.

What is claimed is:

1. An optical pickup apparatus comprising:
   a light source to emit light;
   an objective lens to focus the light emitted from the light source on a target reproduction layer of an optical disc having a plurality of recording layers;
   a photodetector to detect the light reflected from the optical disc; and
   a light scattering area that is not a hologram disposed at least one surface located in an optical path of the optical pickup apparatus to reduce an amount of the light reflected from one or more non-target layers of the recording layers and incident on the photodetector by scattering a part of the light reflected from the optical disc during a reproduction of data from the optical disc.

2. The optical pickup apparatus of claim 1, further comprising a plate located between the photodetector and the objective lens and wherein a surface of the plate is the surface at which the light scattering area is disposed.

3. The optical pickup apparatus of claim 1, further comprising a collimating lens to convert the light emitted from the light source to a parallel light beam, and wherein a surface of the collimating lens is the surface at which the light scattering area is disposed.

4. The optical pickup apparatus of claim 1, further comprising an optical path changer to change a path of the light emitted from the light source, and wherein a surface of the optical path changer is the surface at which the light scattering area is disposed.

5. The optical pickup apparatus of claim 4, wherein the surface of the optical path changer at which the light scattering area is disposed faces the photodetector.

6. The optical pickup apparatus of claim 1, wherein the light scattering area is formed on a surface of the objective lens.

7. The optical pickup apparatus of claim 1, further comprising:
an optical path changer to change a path of the light emitted from the light source; and
an astigmatic lens located between the optical path changer and the photodetector to generate astigmatism to detect a focus error signal,
wherein a surface of the astigmatic lens is the surface at which the light scattering area is disposed.

8. The optical pickup apparatus of claim 1, wherein the photodetector comprises:
a main photodetector to receive a 0 order light reflected from the optical disc; and
a first sub-photodetector and a second sub-photodetector to respectively receive a +1 order light and a −1 order light reflected from the optical disc and detect a tracking error signal based on the received 0 order light, +1 order light, and −1 order light by using a differential push-pull method.

9. The optical pickup apparatus of claim 8, wherein the light scattering area is configured to scatter a portion of the light corresponding to an area of the photodetector.

10. The optical pickup apparatus of claim 1, wherein the light scattering area operates regardless of divergence, convergence, or parallelism of the light as the light is emitted from the light source to the optical disc and reflected back towards the photodetector.

11. An optical path changer used in an optical pickup apparatus including a light source to emit light, an objective lens to focus the light emitted from the light source on an optical disc having a plurality of recording layers, and a photodetector to detect a signal by detecting the light reflected from the optical disc, wherein the optical path changer guides the light emitted from the light source toward the objective lens and the light reflected from the optical disc toward the photodetector, and wherein a light scattering area that is not a hologram is disposed at a surface of the optical path changer facing the photodetector to scatter the light reflected from the optical disc and incident on the photodetector.

12. An optical reproducing apparatus comprising:
a spindle motor to rotate an optical disc having a plurality of recording layers;
an optical pickup movably installed in a radial direction of the optical disc to reproduce information from the optical disc;
a driving portion to drive the spindle motor and the optical pickup; and
a control portion to control focusing and tracking servos of the optical pickup,
wherein the optical pickup apparatus comprises:
a light source to emit light,
an objective lens to focus the light emitted from the light source on a target layer of the optical disc,
a photodetector to detect the light reflected from the optical disc, and
a light scattering area that is not a hologram disposed at a surface located in an optical path of the optical pickup apparatus to reduce an amount of light reflected from a non-target layer of the optical disc and incident on the photodetector by scattering a part of the light reflected from the optical disc during a reproduction of data from the optical disc.

13. The apparatus of claim 12, further comprising a plate located between the photodetector and the objective lens and wherein a surface of the plate is the surface at which the light scattering area is disposed.

14. The apparatus of claim 12, further comprising a collimating lens to convert the light emitted from the light source to a parallel light beam, and wherein a surface of the collimating lens is the surface at which the light scattering area is disposed.

15. The apparatus of claim 12, further comprising an optical path changer to change a path of the light emitted from the light source, and wherein a surface of the optical path changer is the surface at which the light scattering area is disposed.

16. The apparatus of claim 15, wherein the surface of the optical path changer at which the light scattering area is disposed faces the photodetector.

17. The apparatus of claim 12, wherein the light scattering area is formed on a surface of the objective lens.

18. The apparatus of claim 12, further comprising:
an optical path changer to change a path of the light emitted from the light source; and
an astigmatic lens located between the optical path changer and the photodetector to generate astigmatism to detect a focus error signal,
wherein a surface of the astigmatic lens is the surface at which the light scattering area is disposed.

19. The apparatus of claim 12, wherein the photodetector comprises:
a main photodetector to receive a 0 order light reflected from the optical disc; and
a first sub-photodetector and a second sub-photodetectors to respectively receive a +1 order light and a −1 order light reflected from the optical disc, wherein the optical reproducing apparatus receives a tracking error signal based on the detected 0 order light, +1 order light, and −1 order light by using a differential push-pull method.

20. The apparatus of claim 19, wherein the light scattering area is configured to scatter a portion of the light corresponding to an area of the photodetector.

21. The apparatus of claim 12, wherein the light scattering area operates regardless of divergence, convergence, and parallelism of the light as the light is emitted from the light source to the optical disc and reflected back towards the photodetector.

22. A plate used in an optical pickup apparatus including a light source to emit light, an objective lens to focus the light emitted from the light source on an optical disc having a plurality of recording layers, and a photodetector to detect a signal by detecting the light reflected from the optical disc, wherein the plate is disposed anywhere along an optical path from the light source to the photodetector, and comprises a light scattering area that is not a hologram disposed at a surface of the plate to scatter the light reflected from the optical disc and incident on the photodetector.

23. The plate of claim 22, wherein the plate is disposed between an optical path changer to guide the light emitted from the light source toward the objective lens and the light reflected from the optical disc toward the photodetector, and the photodetector.

24. The plate of claim 22, wherein the light scattering area comprises a silicon layer comprising crystal particles having a grain size of not more than 0.05 μm.

25. The plate of claim 22, wherein the light scattering area comprises a light scattering embossed film applied to the surface of the plate.

26. The optical pickup apparatus of claim 1, wherein the light scattering area disposed at the surface located in the optical path of the optical pickup apparatus comprises a layer comprising crystal particles having a grain size of not more than 0.05 μm formed on the surface.

27. The optical pickup apparatus of claim 26, wherein the crystal particles are silicon crystal particles.

28. The optical pickup apparatus of claim 1, wherein the light scattering area disposed at the surface located in the optical path of the optical pickup apparatus comprises a light-scattering embossed film applied to the surface.

29. The optical pickup apparatus of claim 1, further comprising a polished optical element located between the photodetector and the objective lens and wherein the light scattering area is an unpolished surface of the polished optical element.

30. The optical pickup apparatus of claim 1, further comprising a collimating lens to convert the light emitted from the light source to a parallel light beam, and wherein the light scattering area is disposed at two surfaces of the collimating lens.

* * * * *